(12) United States Patent
Taylor

(10) Patent No.: US 6,626,984 B1
(45) Date of Patent: Sep. 30, 2003

(54) HIGH VOLUME DUST AND FUME COLLECTOR

(75) Inventor: R. Drew Taylor, Monroe, WA (US)

(73) Assignee: FSX, Inc., Granite Falls, WA (US)

( * ) Notice: Subject to any disclaimer, the term of this patent is extended or adjusted under 35 U.S.C. 154(b) by 0 days.

(21) Appl. No.: 09/699,156

(22) Filed: Oct. 26, 2000

Related U.S. Application Data

(60) Provisional application No. 60/161,539, filed on Oct. 26, 1999.

(51) Int. Cl.[7] ............................................. B01D 50/00
(52) U.S. Cl. .............................. 96/380; 96/381; 96/384; 55/320; 55/337; 55/447; 55/467; 55/490; 55/DIG. 3
(58) Field of Search .................... 95/268, 269, 273; 96/381, 382, 384, 380; 55/320, 330, 337, 356, 357, 358, 447, 467, DIG. 3, 490; 15/353

(56) References Cited

U.S. PATENT DOCUMENTS

| | | | | |
|---|---|---|---|---|
| 1,871,111 A | * | 8/1932 | Campbell | 55/330 |
| 3,816,982 A | * | 6/1974 | Regnault | 55/337 |
| 4,110,876 A | * | 9/1978 | Weiss et al. | 96/381 |
| 4,248,613 A | * | 2/1981 | Linhart | 55/337 |
| 4,280,245 A | * | 7/1981 | Hiester | 96/384 |
| 4,372,762 A | * | 2/1983 | Cooley | 55/337 |
| 4,786,299 A | * | 11/1988 | DeMarco | 96/385 |
| 5,230,722 A | * | 7/1993 | Yonkers | 55/337 |
| 5,938,803 A | * | 8/1999 | Dries | 55/337 |
| 6,042,628 A | * | 3/2000 | Nishikiori et al. | 55/337 |
| 6,094,774 A | * | 8/2000 | Larsen et al. | 96/382 |
| 6,171,356 B1 | * | 1/2001 | Twerdun | 55/337 |
| 6,269,518 B1 | * | 8/2001 | Yung | 55/337 |

* cited by examiner

Primary Examiner—Duane Smith
Assistant Examiner—Jason M. Greene
(74) Attorney, Agent, or Firm—Todd N. Hathaway

(57) ABSTRACT

An apparatus for removing dust and fumes from a flow of air, particularly a flow of air exhausted from an industrial work area. There is a large, cylindrical filter element mounted within a cylindrical collector barrel so as to define an annular flow space between the two. A vane assembly is mounted at the top of the collector barrel for directing the incoming flow of air along a generally cyclonic path through the flow space, so that sparks and heavy particulates are forced outwardly away from the surface of the filter element, thereby increasing filter life and reducing the chance of fire. The filter element and collector barrel are mounted atop a cabinet which encloses a blower and a silencer section. The silencer section includes one ore more chambers having interior walls for redirecting the flow of air exiting the blower, and the walls are lined with an acoustic insulation material for absorbing sound energy as the flow of air is redirected, thus reducing noise emissions from the assembly. The filtered airflow is exhausted from the cabinet in a vertical direction, away from the work area or areas.

12 Claims, 4 Drawing Sheets

HIGH VOLUME DUST AND FUME COLLECTOR

This application claims the benefit of U.S. Provisional Application(s) No(s).: 60/161,539 Oct. 26, 1999.

BACKGROUND OF THE INVENTION a. Field of the Invention

The present invention relates generally to air filtration systems, and more particularly, to a compact, high volume dust and fume collector for an industrial environment.

b. Related Art

Many industrial operations require air filtration systems to remove particulates and fumes from the workspace atmosphere, for reasons of both safety and productivity.

This is particularly true in heavy manufacturing and other operations that involve significant amounts of welding, grinding and other activities which generate thick smoke and large quantities of dust. The resulting heavy loads of airborne particulates can cause severe stress to both people and machines. Unlike "cleaner" operations, which are able to rely on centralized, comparably low volume air filtration systems, such heavy manufacturing operations require powerful, high capacity systems which will draw smoke, fumes and particulate material away from individual work stations in an effective and rapid manner.

The consistent problem with prior exhaust and filtration systems used in these embodiments is that the heavy particulate loads cause rapid plugging of the filters, necessitating frequent cleaning as well as replacement of the filter elements in order to maintain operating efficiency. Because of the trouble and cost involved, such a treatment is often deferred, to the point where the efficiency of the system often becomes significantly degraded. Moreover, many manufacturing operations generate oily fumes and smoke, so that without very frequent cleaning or replacement, the filter elements tend to become saturated with oil and other hydrocarbon materials. This in turn presents an extreme fire hazard: Because of their very nature, the ventilation and filtration systems tend to collect airborne sparks from the work area, and so it is not uncommon for a spark or other heated particulate material to come into contact with the filter element. If the filter element is oil-soaked the spark can ignite a fire, which is then fanned by the exhaust air flowing through the system; incidents like this have caused major conflagrations at a number of manufacturing facilities, resulting in significant danger to human life and losses running to the millions of dollars.

The increased demands for power and capacity have also lead to corresponding increases in the physical size of the air filtration systems themselves. In part, this is because the makers of conventional systems have chosen to increase capacity by simply increasing the number of filter cartridges in the system. The resulting increases in size present serious problems for many manufacturing facilities, where operating space is at a premium and where production demands often leave little or no room for conventional dust collectors.

Furthermore, the large physical size of most prior high-volume collector/filtration systems obviates any possibility of these systems being configured for portable use. This is a serious drawback in many operations, where it is often desirable to be able to move the filtration system from one workstation or part of the facility to another, depending on when and where specific operations are being performed.

Yet another problem associated with conventional dist and fume collectors is the excessive noise that they tend to generate during operation. In particular, the need for increased capacity has lead to the use of increasingly larger and louder blowers in these systems. Adding this noise on top of that which is generated by the manufacturing operations themselves tends to create an extremely stressful and ridicule work environment, which can be detrimental to both production efficiency and employee well being.

Accordingly, there exists a need for a powerful, high volume dust and fume collector which is able to remove and collect heavy particulate loads without requiring excessive cleaning or replacement of the filter elements. Furthermore, there exists a need for such a dust and fume collector that is capable of filtering oils and hydrocarbon-laden fumes and smoke without presenting a fire hazard in the event that a stray spark is drawn into the system. Still further, there exists a need for such a fume and dust collector having compact dimensions so as to minimize the space occupied thereby when installed in a manufacturing facility. Still further, there exists a need for such a dust and fume collector which can be configured as a portable assembly, so as to be readily transportable from one workstation or part of a facility to the next. Still further, there exists a need for such an apparatus which is highly efficient, and which provides a powerful exhaust flow to quickly and effectively remove fumes and dust from a workstation. Still further, there exists a need for such and apparatus that emits acceptably lower levels of noise while operating. Still further, there exists a need for such an apparatus which is economical to manufacture, and which is easy and economical to service.

SUMMARY OF THE INVENTION

The present invention has solved the problems cited above, and is a compact, powerful apparatus for collecting dust and fumes.

Broadly, this comprises a collector barrel having a generally cylindrical interior which is mounted so that a cylindrical axis thereof is aligned in a substantially vertical direction, a filter element having a general cylindrical exterior and a hollow interior, the filter element extending substantially coaxially within the collector barrel so as to define an annular flow space between the two, and means for directing incoming air on a generally cyclonic path through the annular flow space, so that relatively heavier particulate material in the incoming air is forced outwardly towards the interior of the collector barrel, while relatively finer particulate material is collected by the filter element as filtered air is drawn from the interior thereof.

The means for directing the incoming air may comprise a plurality of fixed vanes mounted at the upper end of the collector barrel for directing the air in a generally downward direction along the cyclonic path through the flow space. The apparatus may further comprise a bower for drawing the filtered air from the interior of the filter element, and the vane assembly, collector barrel, filter element and blower may all be mounted in an in-line configuration so as to form a compact assembly.

The collector apparatus may further comprise a silencer assembly for reducing noise emissions from the blower. The silencer assembly may comprise at least one chamber having interior walls for redirecting a flow of air that is discharged from a blower, the walls of the chamber being lined with an acoustic insulation material for absorbing acoustic energy from the flow of air as it is redirected by the walls. The silencer assembly may further comprise a plurality of exhaust channels through which the discharged air is directed, each of the channels being lined with acoustic insulation material.

The invention also provides a method for collecting dust and fumes. The method comprises the steps of passing the flow of incoming air into an annular flow space defined between a collector barrel having a generally cylindrical interior and a filter element having a generally cylindrical axis thereof is aligned in a substantially vertical direction and so that the filter element extends substantially co-axially within the barrel, and directing the incoming air along a generally cyclonic flow path through the annular flow space, so that relatively heavier particulate material in the incoming air is forced outwardly towards the interior of the collector barrel while relatively finer particulate material is collected by the filter element as filtered air is drawn from an interior thereof.

These and other features and advantages of the present invention will be better understood from a reading of the following detailed description in conjunction with the associated figures.

DETAILED DESCRIPTION

Figure 1:
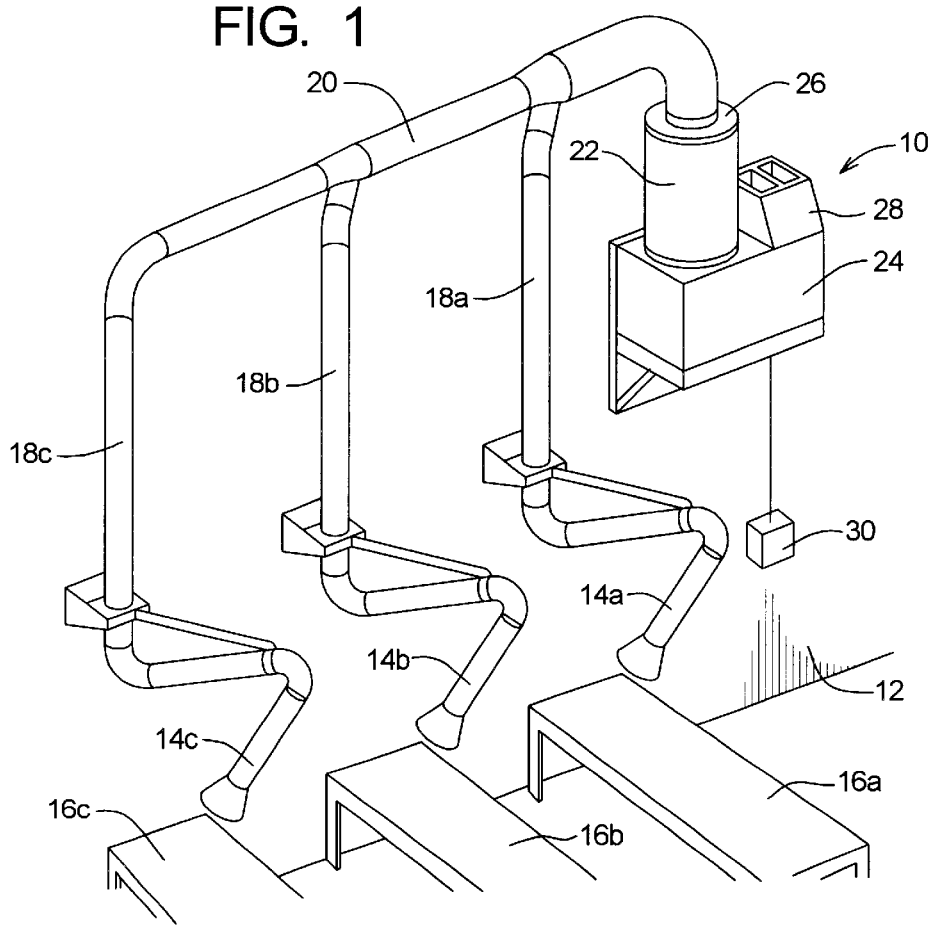
FIG. 1 is a perspective, environmental view showing the collection and filtration system of the present invention installed to collect dust and fumes from several workstations in a manufacturing facility.

FIG. 1 shows a high volume dust and fume collector apparatus 10 in accordance with the present invention. In this embodiment, the collector apparatus is installed more or less permanently on the wall 12 of a manufacturing facility, so as to service a plurality of adjustable exhaust hoods 14A, 14B, 14C which are associated with individual workstations 16A, 16B, 16C. The hoods are connected by ducts 18A, 18B, 18C to a common collector line 20 that feeds the air and suspended material to the collector unit 10. This is but one configuration for the system, and, as will be described in greater detail below, the modular nature of the collector unit enables this to be mounted to a wide variety of other forms of hoods and duct work.

The collector unit itself includes a vertically aligned collector barrel 22 that houses a single, large diameter filter element (not shown in FIG. 1). As will be described in greater detail below, a blower section 24 is mounted to the lower end of the collector barrel to draw the exhaust air downwardly therethrough, and a fin assembly 26 is mounted to upper end of the barrel to impart a cyclonic flow to the incoming air.

After passing through the collector drum and blower, the exhaust air exits the assembly 10 through a silencer section 28. As will also be described in greater detail below, the silencer section is lined with sound absorbing material and employs directional/correctional air flow paths to greatly reduce noise emissions during operation of the assembly; to further suppress noise emissions, the cabinet of the blower section is also lined with sound absorbing material.

As is also shown in FIG. 1, a control unit 30 is suitably provided for selective actuation/adjustment of the collector assembly 10.

Figure 2:
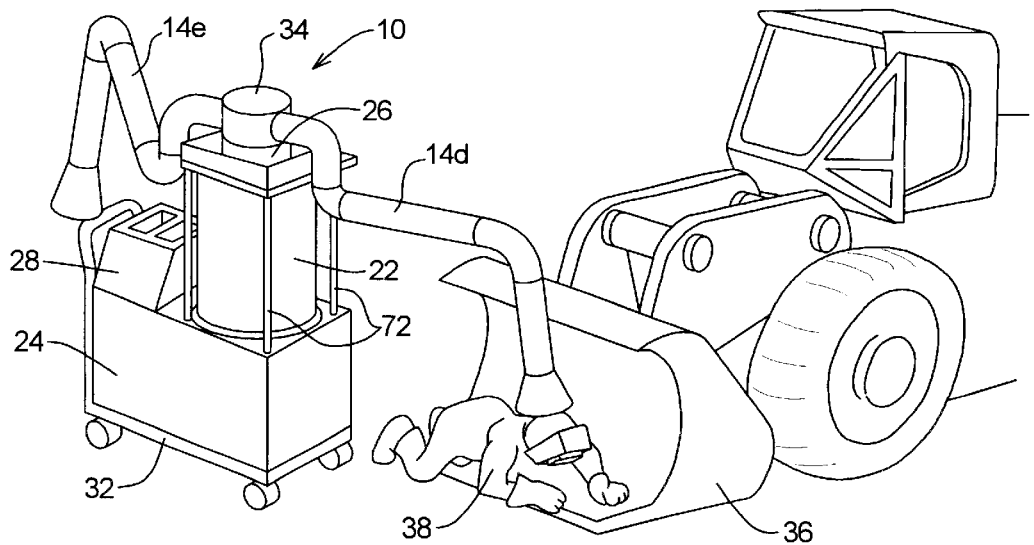
FIG. 2 is a perspective, environmental view showing the apparatus of the present invention configured as a portable assembly for collecting dust and fumes at various locations.

FIG. 2, in turn, shows another dust and fume collector 10 which is substantially identical to that which is shown in FIG. 1, except that in this instance the unit is configured for portable use. As will be described in greater detail below, the present invention makes is possible to construct a powerful and efficient dust and fume collector having compact dimensions and a comparatively light weight, so that this can be mounted for transportation on a push cart 32 or other suitable vehicle. In this configuration, the adjustable exhaust hoods 14d, 14e (or similar attachments) can be connected directly to an in take fitting 34, which is mounted over the fin section of the assembly.

The mobile configuration enables the collector unit 10 to be moved to various workstations or locations as needed, such as to the loader bucket 36, which is shown being welded in FIG. 2. The pivoting exhaust hood can then be maneuvered so the intake can be positioned closely adjacent to the physical location of the worker 38.

b. Components

Figure 3:
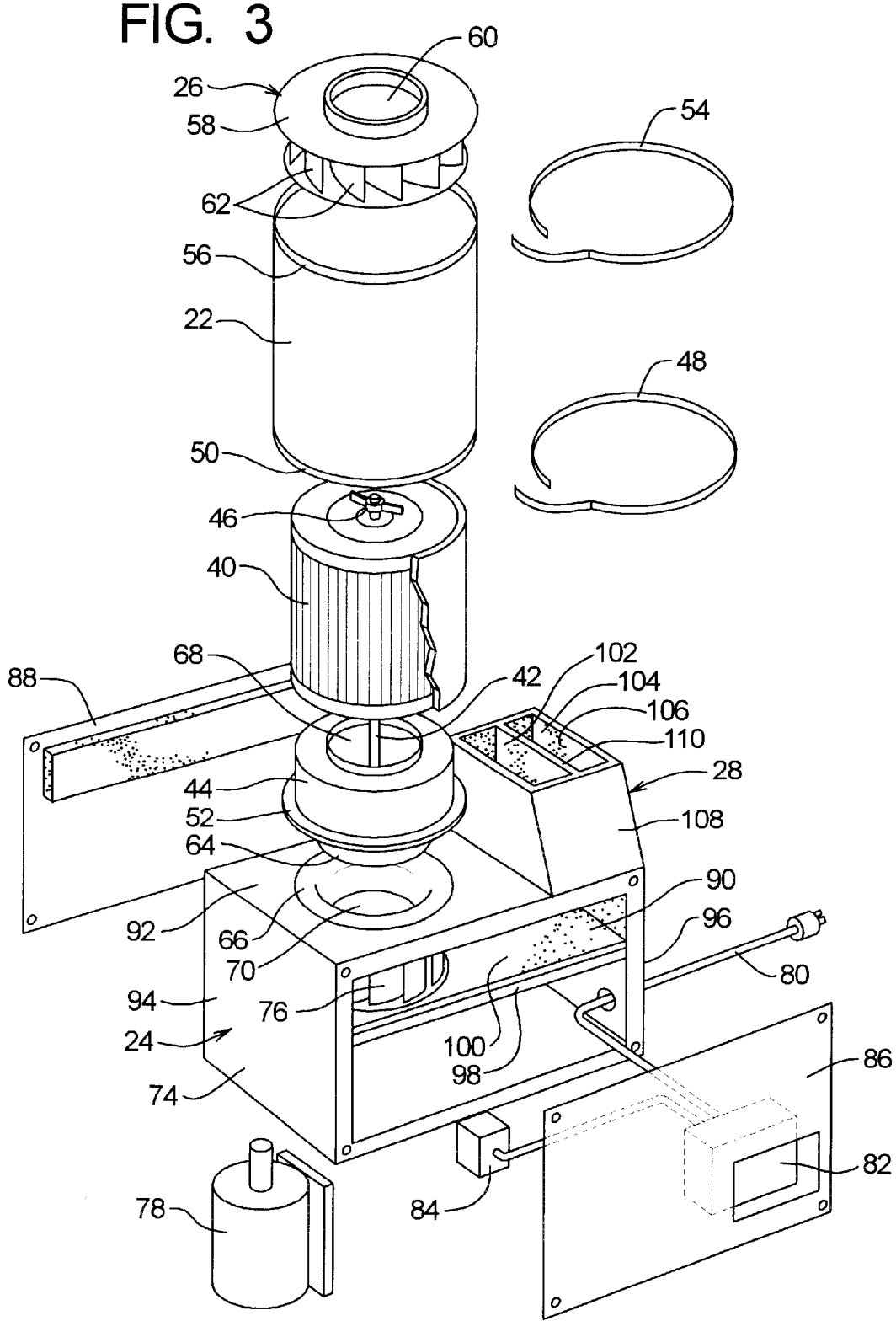
FIG. 3 is a perspective, exploded view of the collection and filtration apparatus of FIGS. 1–2, showing the major components thereof in greater detail.

As can be seen in FIG. 3, the collector unit 10 employs a single "oversized" filter cartridge 40, rather than a plurality of smaller cartridges as in conventional systems. The single cartridge is mounted on a threaded rod 42 so as to extend coaxially within the collector drum 22, thereby forming an annular flow space between the two members.

A suitable filter cartridge for use in the embodiment shown in FIG. 3 is formed of two layers of polypropylene medium and one layer of non-woven polyester medium, and is approximately 18 inches in outside diameter and 23 inches long, with an open bottom end and a closed top. The collector drum for use with this size of cartridge can be suitable formed from a standard plastic or metal 55-gallon drum or other cylindrical member having similar dimensions. It will be understood, however, that the filter cartridge may be formed of any suitable material, and it and the collector barrel may have other dimensions, depending on the size of the other components, the intended use, and other design factors.

The base of the cartridge rests atop a circular sheet metal stand 44, with the lower end of rod 42 being attached at the center of the stand. A wing nut 46 threaded onto the upper end of the rod retains the cartridge on stand 44, and is removable for periodic replacement or cleaning of the cartridge.

The lower end of the collector barrel 22 is also detachably retained on cartridge stand 44, by a draw band 48 that engages the lower lip 50 of the barrel and a corresponding circular phalange 52 on the stand. A second draw band 54 joins the upper lip 56 of the barrel with a circular phalange 58 at the upper end of blade section 26. As will be described in greater detail below, the blade section includes a central inlet opening 60 that feeds air over a plurality of curved, radial extending blades or vanes 62.

Thus assembled, the collector barrel, filter cartridge, blade section and cartridge stand all extend coaxially, and form a compact, cylindrical component which somewhat resembles a "pop can" in external shape. The bottom of the cartridge stand 44 is formed with a somewhat conical, downwardly curved taper 64 which fits within and engages a correspondingly contoured seat 66 on top of blower section 24, with the air outlet passage 68 through the stand being in vertical register with a corresponding inlet opening 70 in the blower section. The engagement between the stand and seat stabilizes the collector barrel and filter on the blower section, and, as can be seen in FIG. 2, additional tie-down rods 72 can be installed to stabilize the filter section when the system is configured for mobile use.

As can be seen with further reference to FIG. 3, the blower section 24 includes a generally rectangular, box-shaped casing 74 in which a blower fan 76 and drive motor 78 are mounted in vertical alignment with the components of the filter section. A 3–5 horsepower blower is suitable for many applications, and a power cord 80, electrical controls 82 and conduit box 84 are included for supplying power to the motor 78. The rectangular casing also includes first and second side panels 86, 88, which are detachable for ease of maintenance and cleaning.

The "in-line" arrangement of the cartridge, collector barrel, and blower creates a highly compact assembly. Moreover, as will be described in greater detail below, the blade section 26 at the top of the filter section quickly establishes a uniform airflow downwardly and around the filter cartridge, thereby eliminating the need for "head room" at the collector intake.

Blower fan 76 draws the air through the filter cartridge and discharges it into a laterally extending plenum 90, which is defined by the two side panels 86, 88, and the top, end, and floor panels 92, 94, 96 and 98 of the blower casing. The interior surfaces of each of these panels is lined with suitably sound insulation material 100, such as a closed cell foam sound absorption media, for example, and the material is preferably provided with dimpling or other surface texturing to increase the level of sound absorption.

The insulation material lining the blower casing provides a first phase of sound absorption, the second phase occurring as the air exists vertically from the opposite end of the plenum through silencer section 28. As will be described in greater detail below, the silencer section includes a plurality of airflow channels 102, 104, each of which is lined with additional sound absorbing material 106. In the embodiment that is shown in FIG. 3 the silencer section has two exhaust channels, which are defined by side walls 108 and a vertically extending divider wall 110, although it will be understood that other embodiments may possess fewer or more channels in the silencer section.

Thus arranged, the components form a compact, powerful collector unit 18 that can serve as a "modular" collector unit for use in a wide variety of different installations. For example, as was noted above, the unit can be configured for portable use, with a comparatively short section of ductwork. In other instances, the circular attachment opening 16 can be connected to ductwork or a plenum serving one or more installed stations (as shown in FIG. 1), or multiple collector units 10 can be "thinned" to provide increased flow as shown in a larger installation. This modularity is to be contrasted with the conventional approach of simply building filtration and other components into the ducting and other parts of the system, and provides several advantages: Firstly, because the triple unit 10 of the present invention is modular rather than being "custom built," it can be manufactured on a far more economical basis than in conventional systems. Furthermore, the modularity offers the facility owner a high degree of flexibility in that the system is easily configured by moving the collector units 10 about and reconfiguring or reattaching the ducting at different location; as compared with the more conventional approach of tearing out and reinstalling a "custom" system, this modularity makes it much easier and cheaper for the facility owner to reconfigure the system based on changes in work areas, production lines, and so on. Still further, in the event that a collector unit 10 requires repair or replacement, it is usually done by simply "unplugging" the unit from the ductwork and installing a replacement, rather than having to tear out large sections of the ductwork as in conventional systems.

c. Operation

Figure 4:
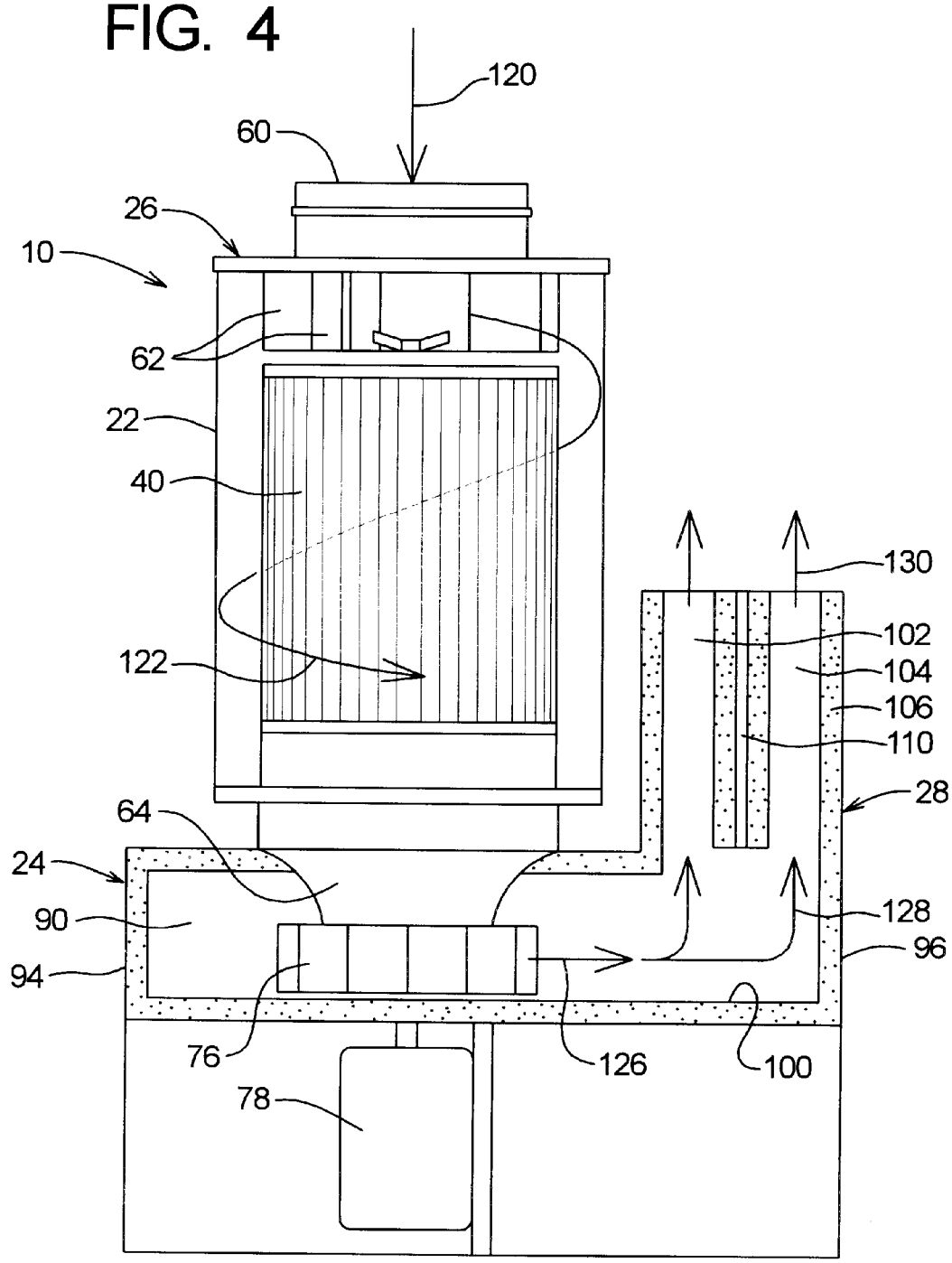
FIG. 4 is a cross-sectional, somewhat schematic view illustrating the operation and flow paths of the collection and filtration apparatus of FIGS. 1–3.

As can be seen in FIG. 4, particulate/fume-laden air enters the inlet opening 60 at the top of the filter section in the direction indicated by arrow 120. The fixed vanes 62 in the fin assembly 26 immediately redirect the air and quickly establish a downward, generally cyclonic flow inside the cylindrical barrel and around the filter cartridge 40, as indicated by arrow 122. As was noted above, this eliminates the need for providing head room at the collector intake, thereby making for a more compact assembly. Furthermore, the downward, cyclonic flow ensures even air distribution across the filter. Use of fixed vanes for the fin assembly, as shown in FIG. 4, has several advantages in terms of simplicity and economy, but it will be understood that in some embodiments rotating and/or powered blades, or other forms of fixed or moving structures, may be used to impart the desired flow to the incoming air; moreover, in some embodiments the flow may be directed on an upward rather than downward cyclonic path.

The cyclonic or "spinning" flow also creates a centrifugal effect which drives heavier particulate materials outwardly towards the wall of the collector barrel, so that these fall through the annular flow cavity and into the space 124 between the barrel and cartridge stand 44. This allows the heavy particulate material to be collected separately, thereby enabling the cartridge to collect a greater quantity of the fine particulate material and significantly increasing filter life.

In addition to particular material, the centrifugal effect also drives any sparks (which ordinarily would be ignited or glowing particulates) outwardly away from the filter, so as to prevent the sparks from coming into contact with the surface of the filter element itself. Thus, even if the filter element is oil-soaked from oil-bearing or hydrocarbon-bearing soot/smoke, the sparks fall harmlessly into the collection area 124, so that the possibility of the filter element catching fire is alleviated. The collector unit of the present invention thus alleviates the fire hazard in the present prior art systems, without requiring special spark traps or the like that would likely add to the cost and reduce the efficiency of the system.

The air passes through the filter medium and into the hollow interior of filter cartridge 40. The tapered lower end of the filter stand acts as a duct that directs the air out the open bottom of the filter cartridge and into blower 76. As was noted above, the air flow is then discharged from the blower into the transverse plenum 90, in the direction indicated by arrow 126 in FIG. 4.

Initial sound absorption is provided by the layer of insulation material 100 which lines plenum 90. The air flow, together with the acoustic energy which is borne thereby, is deflected and redirected by the end wall 96 of the chamber, and then passes upwardly into silencer section 28 as indicated by arrows 128. As was noted above, the air flow through the silencer section is broken into a plurality of exhaust channels 102, 104, each of which is lined with additional sound insulation material 106. Thus, the air flow is deflected and redirected repeatedly as it passes through the silencer section, so that the acoustic energy is absorbed at each impact with the insulating material.

The exhaust air, with greatly reduced acoustic energy, then exits the top of the silencer section in the direction indicated by arrow 130. Thus, not only are both high and low frequency noise greatly reduced, but also what noise remains in the exhaust flow is directed upwardly and away from the work area. Moreover, the upward direction of the discharge avoids the problem of the exhaust air kicking up dust and debris in the work area.

Testing of the exemplary blower and silencer section as described above has demonstrated a reduction in noise from about 96 db (decibels) to about 74 db. This reduction enables the dust/fume collector of the present invention to pass regulatory noise standards, and allows the collector to be used in close proximity to both personnel and quiet-localized processes that require a minimum of noise.

Figure 5A:
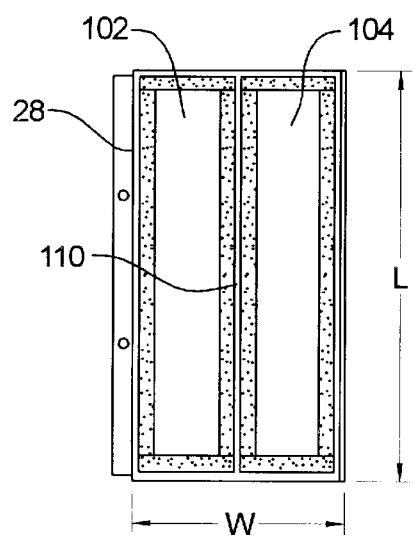
FIGS. 5A–5C are, respectively, plan and front and side elevation views of the exhaust silencer section of the collection and filtration apparatus of FIGS. 1–4.
Figure 5B:
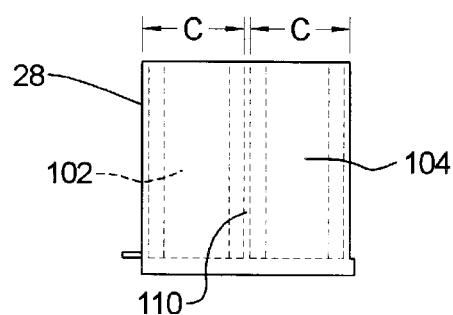
Figure 5C:
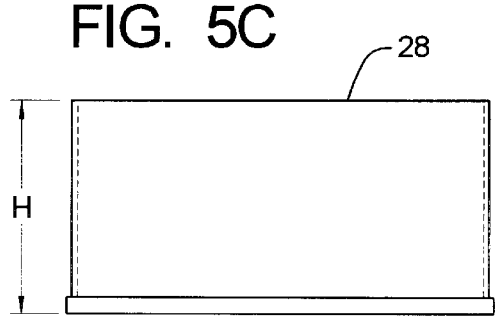

With reference to FIGS. 5a–5c, exemplary dimensions for a silencer section constructed in accordance with the embodiment of the invention, which is shown in FIGS. 1–4, are as follows:

| Length | (l) | 26¼ inches |
|---|---|---|
| Width | (w) | 14 inches |
| Height | (h) | 15 inches |
| Exhaust channel width | (c) | 7 inches |

It is to be recognized that various alterations, modifications, and/or additions may be introduced into the constructions and arrangements of parts described above without departing from the spirit or ambit of the present invention.

What is claimed is:

1. A modular apparatus for collecting dust and fumes, said apparatus comprising:
    a filter section for removing dust and fumes from a flow of air, said filter section comprising:
        a collector barrel having a generally cylindrical interior and mounted so that a cylindrical axis thereof is aligned in a substantially vertical direction;
        a vertically elongate filter cartridge having a hollow interior and a generally cylindrical exterior which extends substantially coaxially within said collector barrel so as to define an annular flow space between said filter element and said collector barrel;
        an upwardly directed intake opening located centrally in an upper end of said collector barrel for receiving said flow of air in a downward direction generally coaxial with said barrel and said filter cartridge; and
        a plurality of stationary, angled, vanes mounted at an upper end of said collector barrel and extending radially from said central intake opening, for receiving said flow of air in a generally coaxial direction from said intake opening and redirecting said flow of air on a generally downward and outward cyclonic flow path through said annular flow space so that comparatively heavy material in said flow of air are forced outwardly towards an interior of said collector barrel and away from said exterior of said filter cartridge;
    a blower section mounted to a lower end of said filter section for drawing flow of air from within said hollow interior of said filter cartridge;
    a silencer section mounted to said blower section for receiving said flow of air from said blower section so as to reduce noise emissions from said apparatus; and
    a means for mounting said central intake opening of said filter section to ductwork for conducting said flow of air from a work area.

2. The apparatus of claim 1, wherein said means for mounting said intake portion of said filter section to said ductwork comprises a generally circular collar mounted around said central intake opening for attachment of an end of said ductwork in generally coaxial alignment with said collector barrel and filter cartridge.

3. The apparatus of claim 2, wherein said silencer section comprises:
    at least one chamber having interior walls for redirecting said flow of air as said flow of air is discharged from said blower section, said interior walls being lined with an acoustic insulation material for absorbing acoustic energy from said flow of air as said flow is redirected by said walls of said chamber.

4. The apparatus of claim 3, wherein said acoustic insulation material comprises impregnated polyester urethane foam.

5. The apparatus of claim 4, wherein said at least one chamber of said silencer section comprises:
    first and second chambers extending at generally right angles to one another, so that said flow of air changes direction approximately 90° in passing through said first and second chambers.

6. The apparatus of claim 5, wherein said first chamber of said silencer section extends laterally from said blower section so as to receive said flow of air therefrom in a generally horizontal direction, and said second chamber of said silencer section extends upwardly from said first chamber so as to redirect and discharge said flow of air received therefrom in a generally vertical direction.

7. The apparatus of claim 6, wherein said second, upwardly extending chamber of said silencer section comprises:
    a plurality of exhaust passages extending in said generally vertical direction, each said exhaust passage being lined with a layer of said acoustic insulation material.

8. The apparatus of claim 6, wherein said blower and silencer sections are housed in a unitary cabinet, with said collection chamber and filter element of said filter section being mounted on and extending upwardly from said cabinet so as to form a compact assembly for both portable and installed use.

9. An apparatus for collecting dust and fumes, said apparatus comprising:
    a generally cylindrical collector barrel for mounting so that an axis thereof extends in a generally vertical direction, said collector barrel comprising:
        a generally cylindrical wall having inner and outer surfaces; and
        upper and lower end openings of approximately equal size;
    a cartridge stand detachably mounted in said lower end opening of said collector barrel, said cartridge stand comprising:
        an annular flange that engages a lip of said barrel around said lower end opening;
        a central outlet opening that extends substantially coaxially with said collector barrel for passage of a flow of air therethrough;
        an upper end that protrudes upwardly into an interior of said collector barrel and has an annular collar formed around said central outlet opening for centering a filter cartridge thereon;
        a lower end that protrudes downwardly from said lower end of said barrel and has a bottom surface for mounting to an intake opening of a blower assembly; and an attachment rod that extends upwardly from said central opening into said interior of said collector barrel;

a filter cartridge detachably mounted to said upper end of said cartridge stand within said interior of said collector barrel, said filter cartridge comprising:
- a generally cylindrical exterior that extends coaxially within said collector barrel so as to define an annular flow space between said filter cartridge and said inner surface of said cylindrical wall of said barrel;
- a hollow interior having a lower end opening that is aligned with said central opening of said cartridge stand by said annular collar thereon;
- an upper end having a closure with a central bore through which an upper end of said cartridge mounting rod protrudes; and
- a fastener mounted on said protruding upper end of said mounting rod so as to detachably secure said filter cartridge to said cartridge stand; and a blade assembly detachably mounted in said upper end opening of said collector barrel, said blade assembly comprising:
- an annular flange that engages a lip of said barrel around said upper end opening;
- a central inlet opening that is aligned generally coaxially with said collector barrel and filter cartridge;
- an upper end that protrudes upwardly from said barrel and has an annular collar formed around said central inlet opening for mounting an end of ductwork so that a flow of air is received from said ductwork in a downward direction generally coaxial with said barrel and said cartridge; and
- a lower end that protrudes downwardly into said barrel and has a plurality of stationary, angled blades that extend radially from said central inlet opening for receiving said flow of air in a generally coaxial direction from said inlet opening and redirecting said flow of air on a generally downward cyclonic path through said annular flow space, so that comparatively heavy material in said flow of air are forced outwardly towards said inner surface of said collector barrel and away from said outer surface of said filter cartridge.

10. The apparatus of claim 9, further comprising:

first and second draw bands that detachably secure said annular flanges of said blade assembly and cartridge stand to said lips around said upper and lower end openings of said collector barrel.

11. The apparatus of claim 10, wherein said bottom surface on said lower end of said cartridge stand comprises:

an external conical taper for engaging a corresponding internal conical taper around said intake opening of a blower so as to stabilize said cartridge stand thereon.

12. The apparatus of claim 11, wherein said fastener on said upper end of said cartridge mounting rod comprises a nut in threaded engagement with an upper end of said rod.

* * * * *